United States Patent
Hasegawa et al.

(10) Patent No.: US 7,573,934 B2
(45) Date of Patent: Aug. 11, 2009

(54) SPREAD SPECTRUM RAKE RECEIVER (75) Inventors: Tsuyoshi Hasegawa, Kawasaki (JP);
Masahiko Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 509 days.

(21) Appl. No.: 11/039,009

(22) Filed: Jan. 13, 2005

(65) Prior Publication Data

US 2005/0123026 A1 Jun. 9, 2005

Related U.S. Application Data

(63) Continuation of application No. PCT/JP02/09414, filed on Sep. 13, 2002.

(51) Int. Cl.
*H04B 1/69* (2006.01)
(52) U.S. Cl. ........................ 375/148; 375/349
(58) Field of Classification Search ................ 375/148, 375/147, 150, 136, 200, 208, 144, 347, 349; 370/335, 342, 441; 455/453
See application file for complete search history.

(56) References Cited

U.S. PATENT DOCUMENTS

| | | | |
|---|---|---|---|
| 6,064,338 A * | 5/2000 | Kobayakawa et al. | 342/378 |
| 6,570,909 B1 * | 5/2003 | Kansakoski et al. | 375/148 |
| 6,618,433 B1 * | 9/2003 | Yellin | 375/148 |
| 6,625,201 B1 * | 9/2003 | Stirling-Gallacher | 375/144 |
| 6,865,218 B1 * | 3/2005 | Sourour | 375/148 |
| 7,103,117 B2 * | 9/2006 | Xu et al. | 375/346 |
| 2002/0154717 A1 * | 10/2002 | Shima et al. | 375/349 |

FOREIGN PATENT DOCUMENTS

| | | |
|---|---|---|
| JP | 10-322312 | 12/1998 |
| JP | 10-336072 | 12/1998 |
| JP | 10-341219 | 12/1998 |
| WO | WO 02/43266 | 5/2002 |

OTHER PUBLICATIONS

Tsuyoshi Hasegawa, et al., "A Study on Multipath Interference Reduction Property using MIXR method for DS-CDMA down link" Fujitsu Laboratories, 2002.
European Search Report dated Dec. 21, 2005.
International Search Report dated Nov. 5, 2002.

(Continued)

*Primary Examiner*—Chieh M Fan
*Assistant Examiner*—Aristocratis Fotakis
(74) *Attorney, Agent, or Firm*—Katten Muchin Rosenman LLP (57) ABSTRACT

Even when the number of paths is increased, interfering noises can be effectively reduced by a rake receiver for use in a spread spectrum communication system. The rake receiver includes a timing detecting unit detecting a reception timing $t_i$ (i=1 to N) of each of N paths when direct spread spectrum signals of the N paths are received; an inverse spreading timing setting unit setting, as a timing for inverse spreading, a timing $t_{i,j,k}$ (k=1 to N, k≠j) at which an inverse spread value is obtained that has interference and correlation from the jth (j=1 to N, j≠i) path included in the inverse spread value of the ith path counted from the reception timing $t_i$ (i=1 to N) detected by the timing detecting unit; a plurality of correlators each obtaining an inverse spread signal of the received signal corresponding to each timing set by the inverse spreading timing setting unit; and a signal composing unit composing outputs of the plurality of correlators.

6 Claims, 9 Drawing Sheets

OTHER PUBLICATIONS

Tsuyoshi Hasegawa, et al. A Study on Multipath Interference Exchange Reduction Method Using Multipath Interfernce Correlative Timing for DS-CDMA down link. The Institute of Electronics, Information and Communication Engineers. Mar. 7, 2002.

Tsuyoshi Hasegawa, et al. Multipath Interference Reduction Method using Multipath Interference Correlative Timing for DS-CDMA Systems. Vehicular Technology Conference, Spring 2002 IEEE 55$^{th}$, vol. 3 pp. 1205-1209.

* cited by examiner

SPREAD SPECTRUM RAKE RECEIVER

CROSS-REFERENCE TO RELATED APPLICATION

The present application is a continuation of International Application No. PCT/JP02/09414 which was filed on Sep. 13, 2002, which is herein incorporated by reference.

BACKGROUND OF THE INVENTION

1. Field of the Invention

The present invention relates generally to a spread spectrum scheme, and more particularly, to a rake receiver that executes, as a reception diversity scheme in a multi-path environment, maximal-ratio composition in the time domain of signals arriving at an antenna with various differences in delay time thereof caused by multiple reflections of propagation paths of the signals.

2. Description of the Related Art

Spread spectrum or spread spectrum communication scheme is utilized extensively as a basic technique for mobile communication. In the direct spread (DS) scheme as the simplest model of the spread spectrum communication, an information signal is transmitted to the receiving side after the spectrum of the information signal is spread by modulating, that is, multiplying the information signal to be transmitted by a PN signal having the chip width Tc of $1/100$ to $1/1000$ of the cycle T of the information signal to be transmitted as a spread signal.

On the receiving side, the signal component is detected from the signal buried in noises by inverse spreading. The inverse spreading basically refers to executing demodulation by multiplying a received signal by a same PN signal having the same phase as that of the PN signal in the received signal.

However, in a multi-path environment for many reflected waves to be present in addition to a direct wave, it is necessary to detect a true signal component by composing appropriately signals received with various differences in delay time.

As one of such conventional techniques, a rake scheme can be listed. "Rake" means a rake in English and the rake scheme is a diversity scheme for executing the maximal-ratio composition by collecting power dispersed due to the delay dispersion of transmission paths, into one like a "rake".

In a conventional rake receiver, a desired signal is demodulated by finding a plurality of path timings at which multiple paths arrive using a known signal, informing a demodulator of these path timings, executing inverse spreading at these timings in the demodulator and composing signals of the multiple paths.

Figure 1:
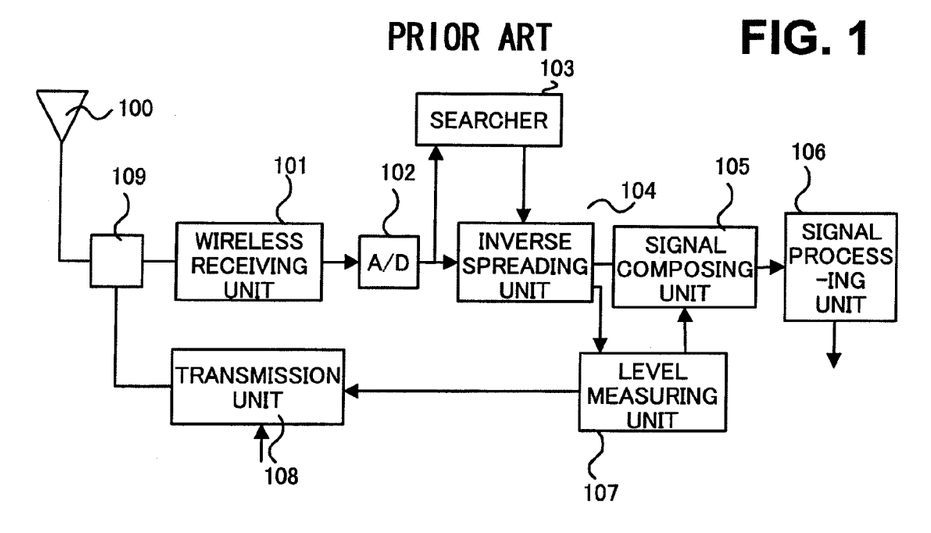
FIGS. 1 is a block diagram showing generally an example of the construction of a rake receiver as a mobile communication terminal.

FIG. 1 is a block diagram showing generally an example of the construction of a rake receiver as, for example, a mobile communication terminal. In the figure, the receiver has an antenna 100, a wireless receiving unit 101, an A/D converting unit 102, a searcher 103 for detecting a plurality of timings of the multiple paths and an inverse spreading timing generating and inverse spreading unit 104 for executing an inverse spreading to the plurality of paths according to the timings of the plurality of paths detected by the searcher 103.

The receiver further has a signal composing unit 105 for composing signals of the plurality of paths obtained by the inverse spreading timing generating and inverse spreading unit 104, a signal processing unit 106 such as a channel codec for receiving an output of the signal composing unit 105 and outputting received signals to a display, speaker, etc., and a level measuring unit 107 for measuring the level of the received signals of the plurality of paths, providing reliability degree information and signal level information to the signal composing unit 105 and providing to a transmission unit 108 control information of transmission power to a base station.

The transmission unit 108 transmits input from a keyboard or a microphone, from the antenna 100 through a duplexer 109 in response to the control information from the level measuring unit 107.

Figure 2:
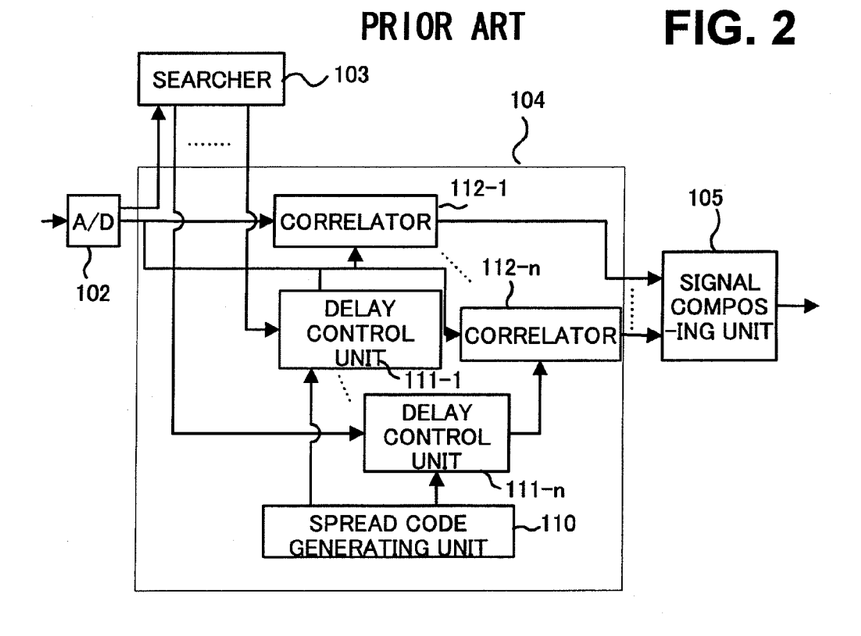
FIG. 2 is a block diagram of the detailed construction of the inverse spreading timing creating and inverse spreading unit 104 of FIG. 1, that is, a signal demodulating unit.

FIG. 2 is a block diagram of the detailed construction of the inverse spreading timing generating and inverse spreading unit 104 of FIG. 1, that is, a signal demodulating unit. In the figure, the signal demodulating unit comprises a spread code generator 110, a plurality of delay control units 111-1 to 111-n and a plurality of correlators 112-1 to 112-n corresponding thereto.

The spread code generator 110 generates a code for inverse spreading. The plurality of delay control units 111-1 to 111-n control respectively delay operations of the plurality of correlators 112-1 to 112-n corresponding respectively to timings t1 to 1N of the multiple paths detected by the searcher 103. Each of the correlators 112-1 to 112-n executes inverse spreading on the received signals from the A/D converting unit 102 according to the inverse spread timings controlled by the corresponding delay control units 111-1 to 111-n.

Thereby, the correlators 112-1 to 112-n respectively provide inverse spread signals 1 to N to the signal composing unit 105 and the signal composing unit 105 composes these signals and outputs a demodulated signal.

Such an inverse spread signal includes a channel estimation signal corresponding to a propagation coefficient of each of the multiple paths.

As described above, for example, in FIG. 2, inverse spreading is executed using the timings themselves of each path of the multiple paths. When inverse spreading is executed at a timing, signals corresponding to paths other than the path of this timing are all interference. Especially, in the case where an orthogonal spread code is used for a plurality of channels in a downlink from a base station in the CDMA scheme, a problem exists that the reception property is degraded due to the multi-path interference.

Considering the above point, the inventor has previously proposed a rake receiver capable of suppressing multi-path interference when the spread spectrum scheme is used in a multi-path environment in Japanese Patent No. 2001-332510.

Figure 3:
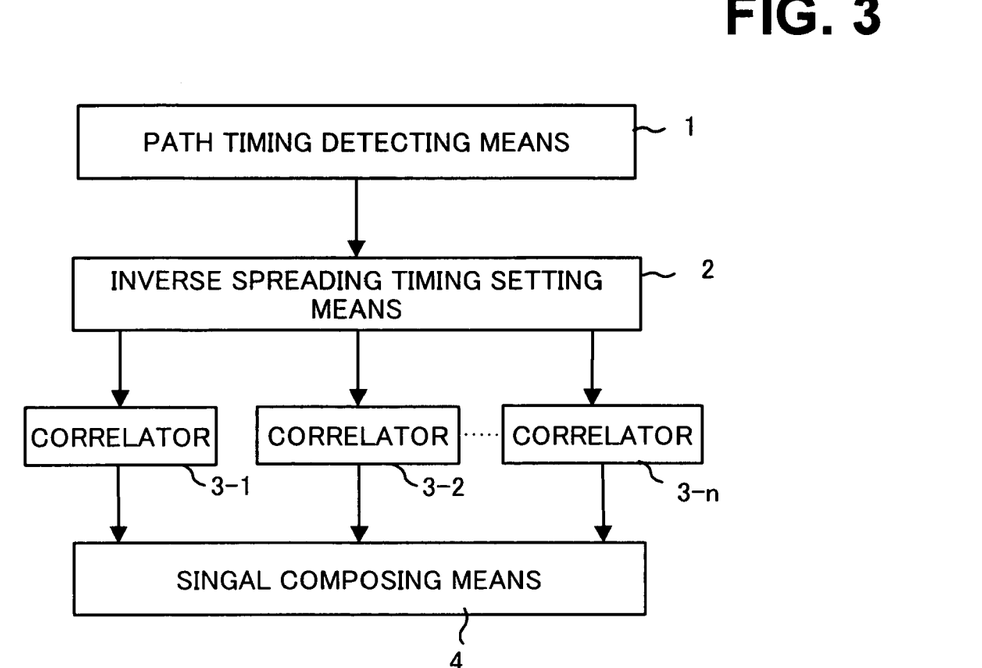
FIG. 3 is a block diagram of the principle construction of a rake receiver constituting a spread spectrum communication system in a multi-path environment, previously proposed.

Here, the schematic construction of such a rake receiver as proposed previously will be described. FIG. 3 is a block diagram of the principle construction of a rake receiver constituting a spread spectrum communication system in a multi-path environment, previously proposed.

In FIG. 3, path timing detecting 1 correspond to, for example, the path searcher 103 of FIG. 1 and FIG. 2 detect timings of, for example, N paths.

Inverse spreading timing setting 2 set the detected timings of the paths as timings for inverse spreading, that is, timings for demodulating spread encoding signal by multiplying an inverse spread code. Concurrently, settings are made to all combinations of two (2) paths such that, taking the center at a timing of one (1) path of arbitrary two (2) paths, two (2) timings at positions symmetrical to the timing of the other path on the time axis by the delayed time of the timings of the two (2) paths are timings of the inverse spreading.

A plurality of correlators 3-1 to 3-n respectively obtains an inverse spreading signal of a signal resulted from, for example, A/D conversion of a signal sent from the transmitting side in response to each timing having been set. Signal composing 4 compose outputs of the plurality of correlators 3-1 to 3-n and output a demodulated signal.

As described above, in the present invention proposed in the previous application, interference component contained in a desired signal is reduced using a multi-path interference correlative signal (MICS) reproduced using only information of selected two (2) paths.

However, as described above, in the present invention of the previous application, a drawback is recognized that the effect of the reduction of the interference component becomes smaller as the number of the paths increases because the information of only selected two (2) paths is utilized when the interference component is reproduced. That is, information that must be contained in paths other than the noted two (2) paths can not be utilized.

SUMMARY OF THE PRESENT INVENTION

It is therefore the object of the present invention to provide a spread spectrum rake receiver capable of overcoming such disadvantage of the present invention of the previous application.

In order to achieve the above object, according to a first aspect of the present invention there is provided a rake receiver for use in a spread spectrum communication system, comprising timing detecting operable to detect a reception timing $t_i$ (i=1 to N) of each of N paths when direct spread spectrum signals of the N paths are received; inverse spreading timing setting operable to set, as a timing for inverse spreading, a timing $t_{i,j,k}$ (k=1 to N, k≠j) at which an inverse spread value is obtained that has interference and correlation from the jth (j=1 to N, j≠i) path included in the inverse spread value of the ith path counted from the reception timing $t_i$ (i=1 to N) detected by the timing detecting; a plurality of correlators each operable to obtain an inverse spread signal of the received signal corresponding to each timing set by the inverse spreading timing setting; and signal composing operable to compose outputs of the plurality of correlators.

The rake receiver may further comprise, between the correlators and the signal composing, a circuit operable to compose a multi-path interference signal (mics(i,j,k)) of a path k (k≠j) from the following Eq. (1), $$MICS(i, j) = r_{i,j} \sum_{k=j} r'_k mics(i, j, k),\qquad \text{Eq. (1)}$$

to reproduce interference $\alpha_j I_{i,j}$ and subtract the interference MICS(i,j) from the ith path.

When the multi-path interference signal (mics(i,j,k)) is composed, coefficients $r_{i,j}$ and $r'_k$ of Eq. (1) may be obtained from the following Eq. (2) and Eq. (3), $$r_{i,j} = \alpha_j I^2 / \{(I/N)_j + 1\} \qquad \text{Eq. (2),}$$

$$r'_k = \alpha^*_k / \{\Sigma_{l \neq k} |\alpha_l|^2 I^2 + n^2\} \qquad \text{Eq. (3),}$$

and the multi-path interference signal (mics(i,j,k)) may be composed using the maximal ratio composition.

When the multi-path interference signal (mics(i,j,k)) is composed, noises of the multi-path interference signal (mics(i,j,k)) may be approximated to be constant and the coefficients $r_{i,j}$ and $r'_k$ of Eq. (1) may be obtained from the following Eq. (4) and Eq. (5), $$r_{i,j} = \alpha_j (I/N)_j / \{(\Sigma_{k \neq j} |\alpha_k|^2)((I/N)_j + 1)\} \qquad \text{Eq. (4),}$$

$$r'_k = \alpha^*_k \qquad \text{Eq. (5),}$$

and the multi-path interference signal (mics(i,j,k)) may be composed using the maximal ratio composition.

The circuit operable to subtract the interference MICS(i,j) may include a circuit operable to select a plurality of paths having high power, and the circuit operable to subtract the interference MICS(i,j) may subject the selected paths to processes for composing the multi-path interference signal (mics (i,j,k)) and subtracting the interference MICS(i,j).

The circuit operable to subtract MICS(i,j) from the ith path may select a plurality of paths i having high power and may be provided in the quantity corresponding to the number of the selected paths.

The inverse spreading timing setting may detect coincidence between the timing $t_{i,j,k}$ for the inverse spreading and a reception timing $t_i$ and, may not subject the paths between which the coincidence has been detected, to the processes for composing the multi-path interference signal (mics(i,j,k)) and subtracting the interference MICS(i,j).

The rake receiver may further comprise a level compensating circuit disposed between the circuit operable to subtract the interference MICS(i,j) and the signal composing, the level compensating circuit acting to compensate the levels of signals after reduction of the interference in the circuit operable to reduce the interference MICS(i,j) to keep the level of the noises constant.

The rake receiver may further comprise, at the preceding stage of the correlators, a circuit operable to compose a multi-path interference signal (mics(i,j,k) of a path k (k≠j) from Eq. (1)

$$MICS(i, j) = r_{i,j} \sum_{k=j} r'_k mics(i, j, k),\qquad \text{Eq. (1)}$$

to reproduce interference $\alpha_j I_{i,j}$, and subtract the interference MICS(i,j) from the ith path.

The circuit operable to subtract the interference MICS(i,j) may include a circuit operable to select a plurality of paths having high power, thereby subjecting the selected paths to the processes for composing the multi-path interference signal (mics(i,j,k)) and subtracting the interference MICS(i,j).

The circuit operable to subtract the interference MICS(i,j) from the ith path may select a plurality of paths i having high power and may be provided in the quantity corresponding to the number of the selected paths.

The above and other features of the present invention will become more apparent from the description of the embodiments of the invention when taken in conjunction with the accompanying drawings which follow.

DESCRIPTION OF THE PREFERRED EMBODIMENTS

Here, prior to the description of an exemplary embodiments of the present invention, the principle of the previously applied invention by the present inventor described above will be further described for the full understanding of the present invention.

When signals of multiple paths are inversely spread at a timing, signals of paths that occur interference are determined by mutual correlation value of an inverse spreading signal, the attenuation coefficient of a propagation path, etc. The correlation value of an inverse spreading signal is a constant determined by the delay between the timing of a signal arrived through a path and the timing of inverse spreading.

Figure 4:
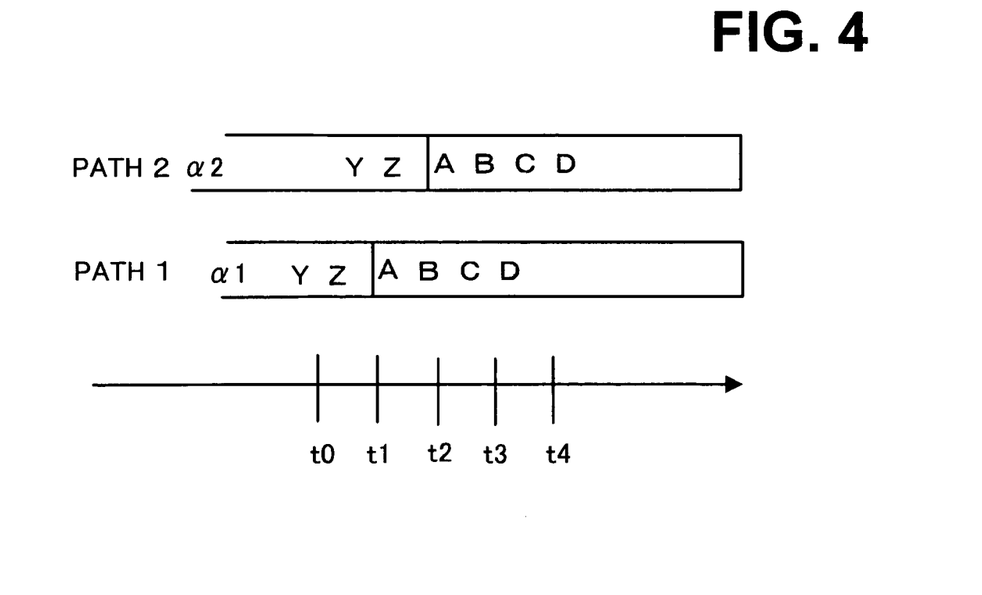
FIG. 4 shows timings of signals of two (2) paths received by a CDMA (Code Division Multiple Access) mobile terminal.

FIG. 4 shows timings of signals of two (2) paths received byaCDMA (Code Division Multiple Access) mobile terminal. In the figure, ··YZABCD·· are labels indicating signal timings of each path and "A" is assumed to be the correct inverse spreading timing. The channels of a path 1 and a path 2 are denoted respectively by $\alpha_1$ and $\alpha_2$. Inverse spreading timings are respectively denoted by $t_1$ and $t_2$ and signals inversely spread at these timings are respectively denoted by $x_1$ and $x_2$.

Here, defining a special timing $t_0 = t_{1-(t2-t1)}$ and denoting a signal inversely spread at the timing $t_0$ by $x_0$, $x_1$ and $x_0$ can be represented as follows.

$$x_1 = \alpha_1 S + \alpha_2 I_Z + n_1$$

$$x_0 = \alpha_1 I_Z + \alpha_2 I_Y + n_0$$

$\alpha_1 S$ is a desired signal obtained by inversely spreading the path 1 from A and $\alpha_2 I_Z$ is interference obtained by inversely spreading the path 2 from Z. Furthermore, $\alpha_2 I_Y$ is a signal obtained by inversely spreading the path 2 from Y, and $n_1$ and $n_0$ are respectively noises thereof.

The above signal $x_0$ is a signal obtained by inversely spreading at a timing that can not be obtained, of a received signal S, and $\alpha_1 I_Z$ is contained therein. That is, it can be seen that $\alpha_1 I_Z$ has correlation with an interference component $\alpha_2 I_Z$ of $x_1$. In this sense, a signal like $x_0$ is referred to a "Multi-path Interference Correlative Signal (MICS)" of the path 1 to the path 2, and a timing like $t_0$ is referred to as a "Multi-path Interference Correlative Timing (MICT)" of the path 1 to the path 2.

The interference component of $x_1$ can be reduced by multiplexing an appropriate coefficient r from $x_1$ to $x_0$ because $x_0$ has correction with the interference component of $x_1$.

However, here, it should be noted that another interference component $I_Y$ contained in $x_0$ is increased when the coefficientris determined such that $I_Z$ contained in $x_1$ is completely cancelled. Therefore, the total magnitude of the interference may be increased instead of being decreased. Therefore, the appropriate coefficient r needs to be a coefficient that is determined such that the total power of the interference becomes minimum remaining the original interference $I_Z$.

In the previously applied invention described above, the information of only two (2) paths selected when interference components are reproduced is used. Therefore, information contained in paths other than the noted two (2) paths can not be utilized. Therefore, the reduction effect of the interference components is small.

Therefore, the present invention solves such a drawback of the previously applied invention and improves the interference reproduction accuracy by using all the paths except interference sources in order to reproduce interference components. The principle of the present invention will be described as follows.

Figure 5:
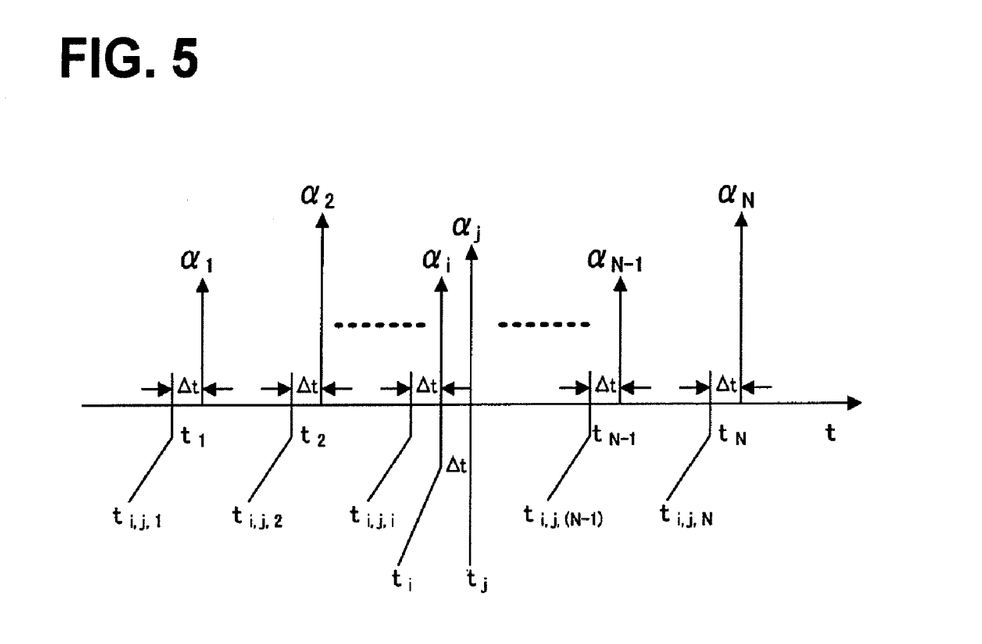
FIG. 5 shows N path signals, and a plurality of Multi-path Interference Correlative Timings (MICTs) that can be utilized for reduction of interference of a path j contained in a path i.

FIG. 5 shows N path signals, and a plurality of Multi-path Interference Correlative Timings (MICTs) that can be utilized for reduction of interference of a path j contained in a path i. A signal inversely spread at a timing of the path i is represented as follows.

$$x_i = \alpha_i S + \sum_{j=1} \alpha_j I_{i,j}$$

Here, S is a desired signal, $I_{i,j}$ is an interference component by the path j contained in $x_i$. In FIG. 5, a timing $t_{i,j,i}$ is a multi-path interference correlative timing (MICT) used in the previous application. The timing $t_{i,j,i}$ is a timing shifted from the timing $t_i$ by the time difference $\Delta t$ between the path i and the path j. A signal having a correlation with $I_{i,j}$ can be obtained by inversely spreading at this timing $t_{i,j,i}$.

Here, noting paths other than the paths i and j, similarly to the timing $t_{i,j,i}$, a signal having a correlation with $I_{i,j}$ can be obtained by inversely spreading at a timing $t_{i,j,k}$ (k is a value from 1 to N except j.) shifted from each of the paths by $\Delta t$. The signals obtained by inversely spreading at the timings $t_{i,j,k}$ and $t_{i,j,k}$ are represented as follows.

$$t_{i,j,k} = t_i - t_j + t_k$$

$$m_{i,j,k} = \sum_l \alpha_l I_{i,j,k} + n_{i,j,k} = \alpha_k I_{i,j} + \sum_{l=k} \alpha_l I_{i,j,k,l} + n_{i,j,k}$$

where $I_{i,j,k,l} = (t_i - t_j + t_k - t_l)$ and, especially $I_{i,j,k} = I_{i,j}$.

Next, an embodiment of the present invention will be described based on the above principle of the present invention.

Figure 6:
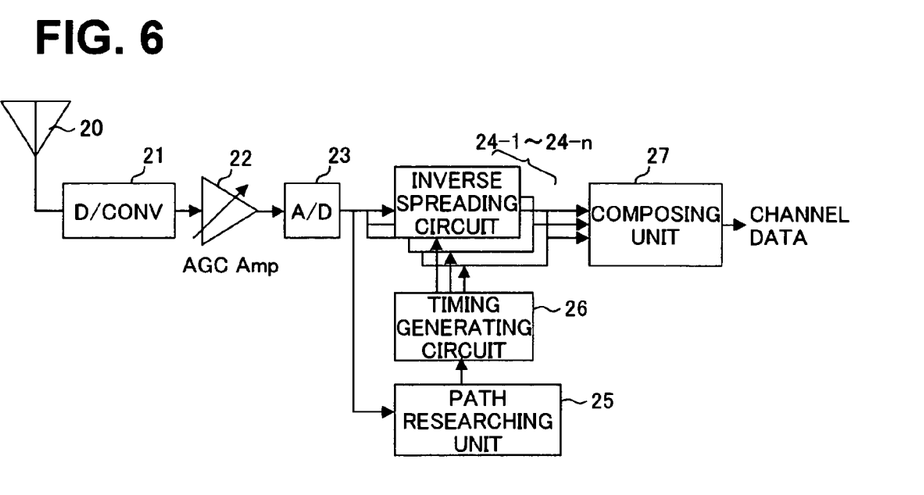
FIG. 6 shows an example of the construction of a CDMA receiver applied with the present invention.

FIG. 6 shows an example of the construction of a CDMA receiver applied with the present invention. A CDMA signal received by an antenna 20 is converted into a base-band signal by a down-converter 21.

The base-band signal is inputted into an A/D converter 23 through an AGC amplifier 22. Here, the base-band signal is converted into a digital signal and is inputted into inverse spreading circuit units 24-1 to 24-n corresponding to the number of paths n and into a path searching unit 25.

In the path searching unit 25, a timing of each of the paths of the multi-paths is obtained from the received signal. Based on these path timings, inverse spreading timings $t_{i,j,k,n}$ are created by a timing generating circuit 26 according to the following equation.

$$t_{i,j,k,n} = t_i - (t_j - t_k)n$$

The inverse spreading timings $t_{i,j,k,n}$ are sent respectively to the corresponding inverse spreading circuit units 24-1 to 24-n and inverse spreading processes are executed at the respective timings. Inverse spread outputs obtained in the inverse spreading circuit units 24-1 to 24-n are composed in the composing unit 27 and an inverse spread signal is obtained.

Figure 7:
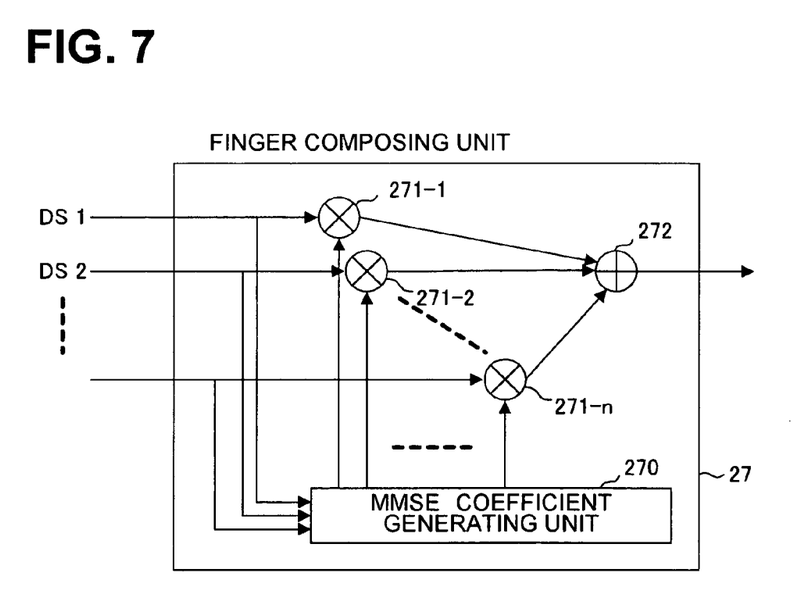
FIG. 7 shows an example of the construction of a composing unit 27 of FIG. 6.

FIG. 7 shows an example of the construction of a composing unit 27 of FIG. 6. Here, the construction of an MMSE receiver is shown as an embodiment. Therefore, the composing unit 27 has an MMSE coefficient generating unit 270.

The MMSE coefficient generating unit 270 obtains composition coefficients that maximizes the S/N of received signals. These coefficients are multiplied as the coefficients to multipliers 271-1 to 271-n respectively corresponding to each of fingers. The MMSE coefficient generating unit 270 further comprises an adder 272 that adds the outputs of these multipliers 271-1 to 271-n. Thereby, an output that maximizes the S/N of the received signals can be obtained from the adder 272.

With the construction of FIG. 6 applied with the present invention, effective timings for inverse spreading can be easily obtained and, therefore, a preferable effect can be obtained with a few inverse spread fingers.

Figure 8:
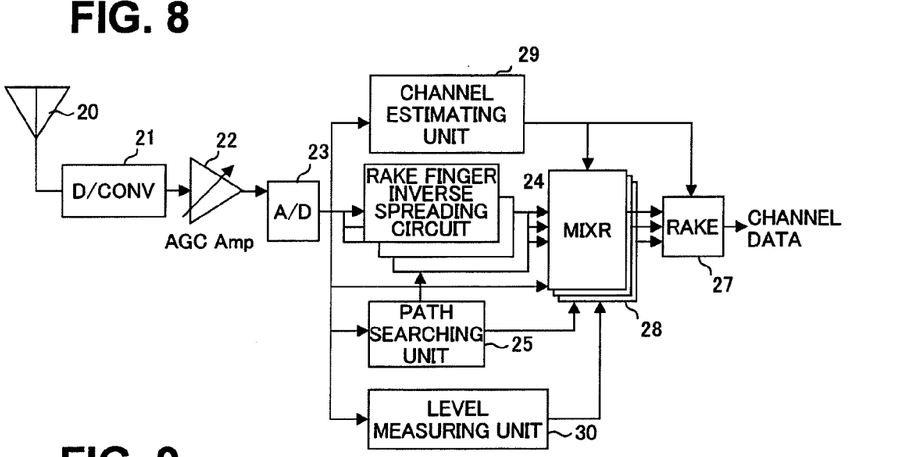
FIG. 8 shows another exemplary embodiment of the present invention.

FIG. 8 shows another exemplary embodiment of the present invention. A multi-path interference exchange reduction (MIXR) circuit 28 is provided between the inverse spreading circuit units 24-1 to 24-n and a rake composing unit 27 compared to the exemplary embodiment of the construction of FIG. 6. Interference of each finger is reduced by this multi-path interference exchange reduction (MIXR) circuit 28.

Figure 9:
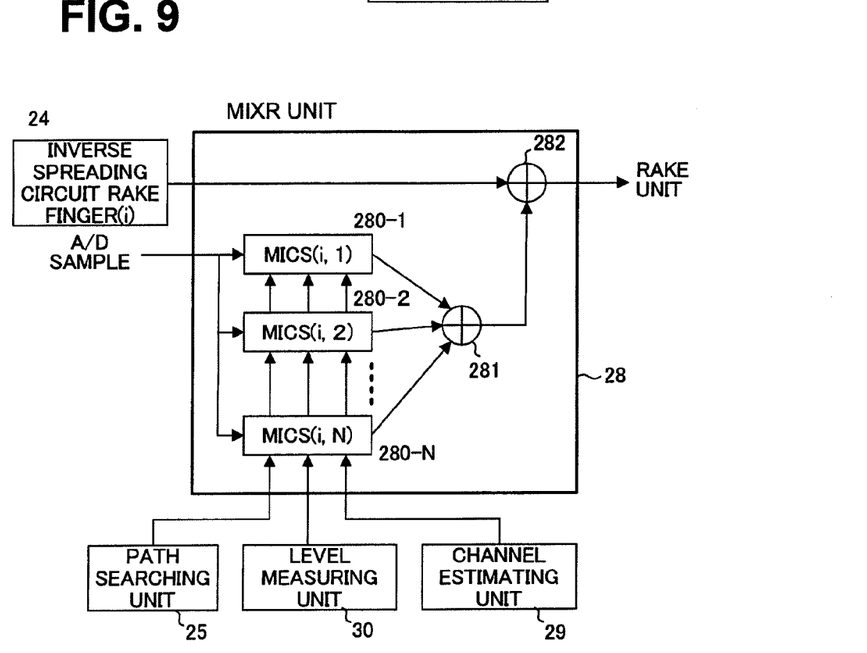
FIG. 9 shows the detailed construction of a multi-path interference exchange reduction circuit 28.

FIG. 9 shows the detailed construction of the multi-path interference exchange reduction circuit 28. Interference is reduced by reproducing the interference caused by the path j contained in the path i in the MICS units 280-1 to 280-N, adding all outputs of MICS units 280-1 to 280-N in the adder 281 and subtracting the result of the adding from a signal of the path i.

Each of the above MICS units 280-1 to 280-N reproduces interference entering from the path j to the path i (j≠i).

Figure 10:
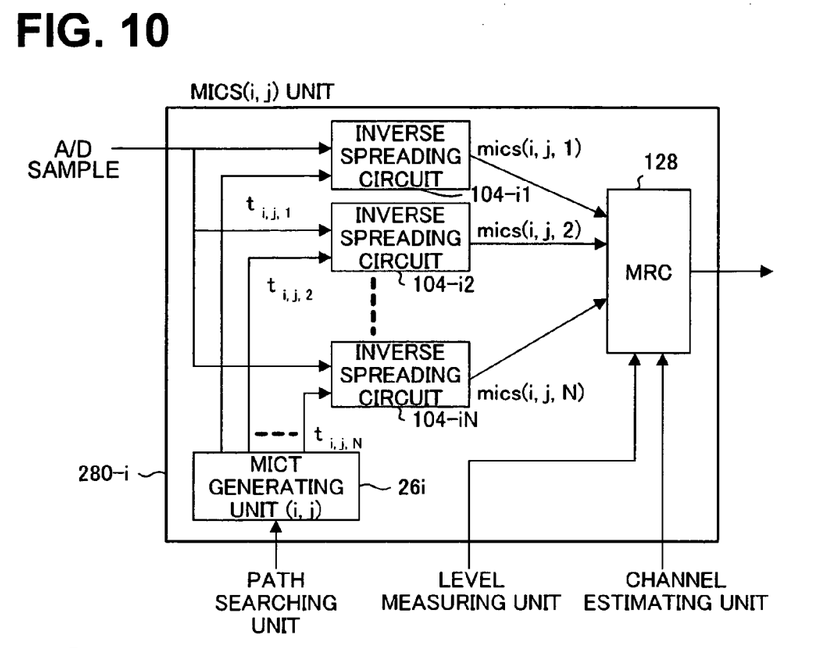
FIG. 10 shows the details of MICS units 280-1 to 280-N represented by a MICS unit 280-$i$.

FIG. 10 shows the details of the MICS units 280-1 to 280-N represented by a MICS unit 280-i. Based on timing information $t_i$ of a rake path obtained by the path searching unit 25, multi-path interference correlative timings (MICT) $t_{i,j,k}$ are obtained in the timing generating circuit 26i according to the following equation.

$$t_{i,j,k} = t_i - t_j + t_k \ (j \neq i)$$

A signal mics(i,j,k) inversely spread by the respectively corresponding inverse spreading circuits 104-i1 to 104iN at this obtained timing $t_{i,j,k}$ is obtained and these signals are composed and outputted by an MRC unit 128.

Figure 11:
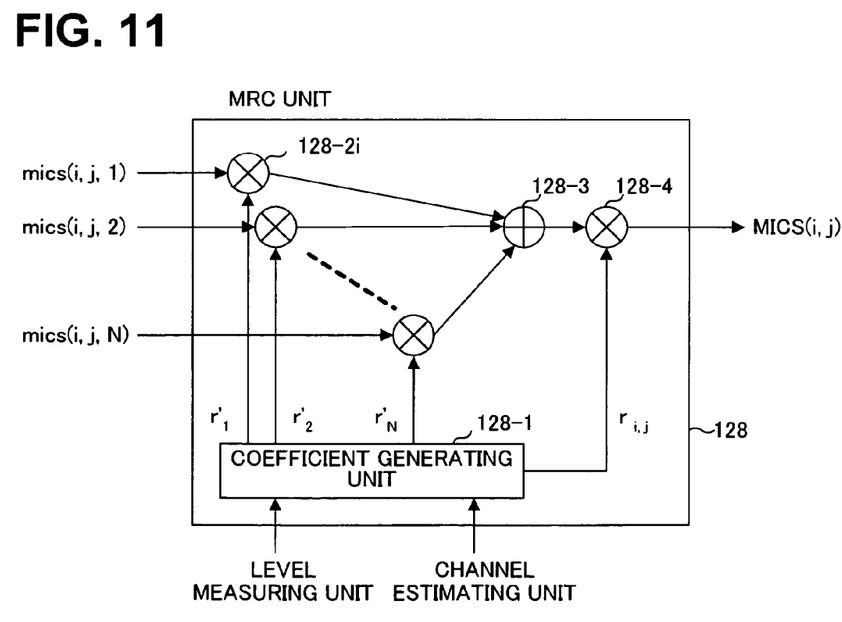
FIG. 11 shows an example of the construction of an MRC 128.

FIG. 11 shows an example of the construction of the MRC 128. In the MRC 128, the signal mics(i,j,k) is multiplied in a multiplier 128-2i by an appropriate coefficient $r'_k$ obtained by a coefficient generating unit 128-1 based on a channel estimation value $\alpha_i$ (i=1 to N) obtained from a channel estimating unit 29 and the noise power $n^2$ obtained from a level measuring unit 30, and the products are added by an adder 128-3. Furthermore, the output of the adder 128-3 is multiplied by a coefficient $r_{i,j}$ in an adder 128-4 and the MICS(i,j) is obtained. Therefore, the MICS(i,j) is represented by the following equation.

$$MICS(i, j) = r_{i,j} \sum_{k=j} r'_k \, mics(i, j, k)$$

Here, the coefficient $r'_k$ and $r_{i,j}$ are obtained as follows.

$$r'_k = \alpha_k^* / \{\Sigma_{l \neq k} |\alpha_l|^2 I^2 + n^2\}$$

$$r_{i,j} = \alpha_j I^2 / \{(I/N)_j + 1\}$$

where $(I/N)_j$ is the ratio of interference to be reproduced and the power of interference other than that and is obtained as follows.

$$(I/N)_j = \sum_{k=j} |\alpha_k|^2 I^2 \bigg/ \left\{ \sum_{l \neq k} |\alpha_l|^2 I^2 + n^2 \right\}$$

In the previously applied invention, the coefficient $r_i$ is obtained as follows using only the path i as represented in Eq. 3 when the MICS(i,j) is obtained.

$$MICS(i,j) = r_i \, mics(i,j,i)$$

$$r_i = \alpha_i^* \alpha_j I^2 / \{\Sigma |\alpha_l|^2 I^2 + n^2\}$$

In contrast, in the present invention, the accuracy of the MICS(i,j) can be improved and the reduction effect of interference can be improved by composing using paths other than the path i as already shown.

Here, in the process of the MRC unit 128 of FIG. 11, the coefficient $r'_k$ to multiply mics(i,j,k) is obtained as follows approximating the noises to be constant when the MICS(i,j) is obtained.

$$r'_k = \alpha_k^*$$

$$r_{i,j} = \alpha_j (I/N)_j / \{(\Sigma_{k \neq j} |\alpha_k|^2)((I/N)_j + 1)\}$$

Thereby, the size of the circuitry and the amount to be processed can be reduced.

Figure 12:
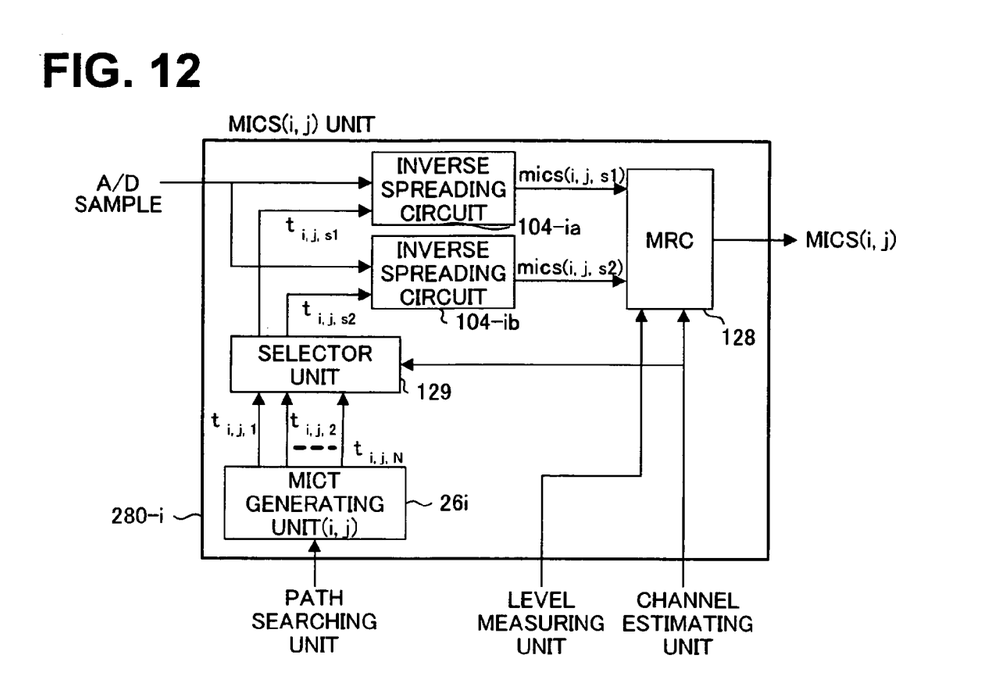
FIG. 12 shows another example of the construction of the MICS unit 280-$i$.

FIG. 12 shows another example of the construction of the MICS unit 280-i. Compared to FIG. 10, this construction has a selector unit 129 as a characteristic thereof. The selector unit 129 determines the magnitude of a path based on a channel estimation value from the channel estimating unit 29 and obtains mics(i,j,k) only for large paths. Thereby, the size of the circuitry and the amount to be processed can be reduced without degrading considerably the performance.

In the example of the construction of FIG. 12, two with k=s1 and s2 are selected from the inverse spreading circuits 104-ia and ib.

The MIXR process of the MIXR circuit 28 of FIG. 8 exerts a high effect when the MIXR process is applied to large paths.

Figure 13:
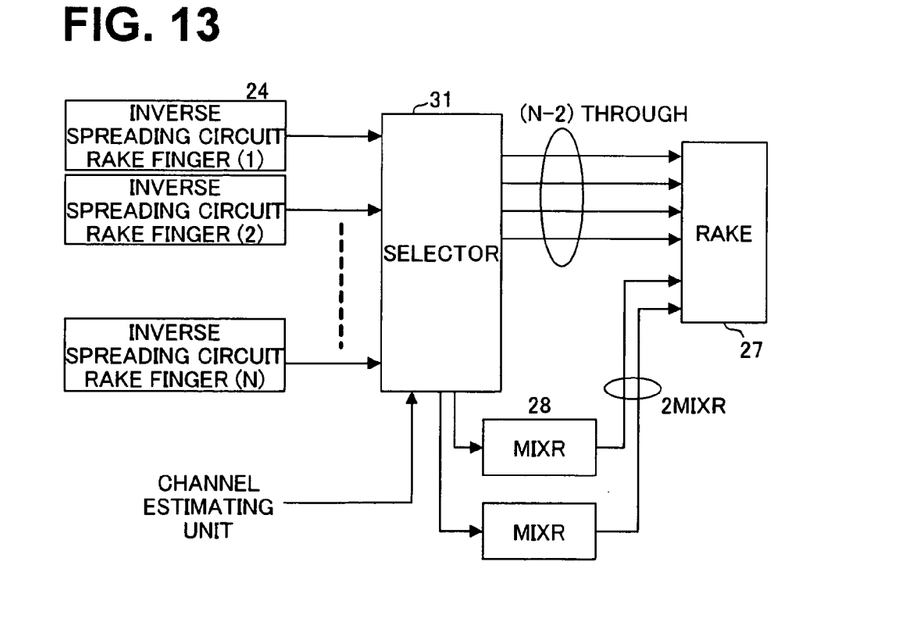
FIG. 13 shows a construction that is provided with a selector circuit 31 at the preceding stage of a MIXR circuit 28, as an exemplary embodiment.

FIG. 13 shows a construction that is provided with a selector circuit 31 at the preceding stage of a MIXR circuit 28, as an exemplary embodiment. The selector unit 31 controls such that the magnitude of the path is determined based on the channel estimation value from the channel estimating unit 29 and the MIXR processes are executed only on large paths.

Paths that are not targets of the MIXR process are lead directly to the rake circuit 27 to undergo a rake process without undergoing any other process before undergoing the rake processes. The example of the construction of FIG. 13 is a construction for MIXR-processing two (2) paths and not executing any processes to other (N-2) processes.

Figure 14:
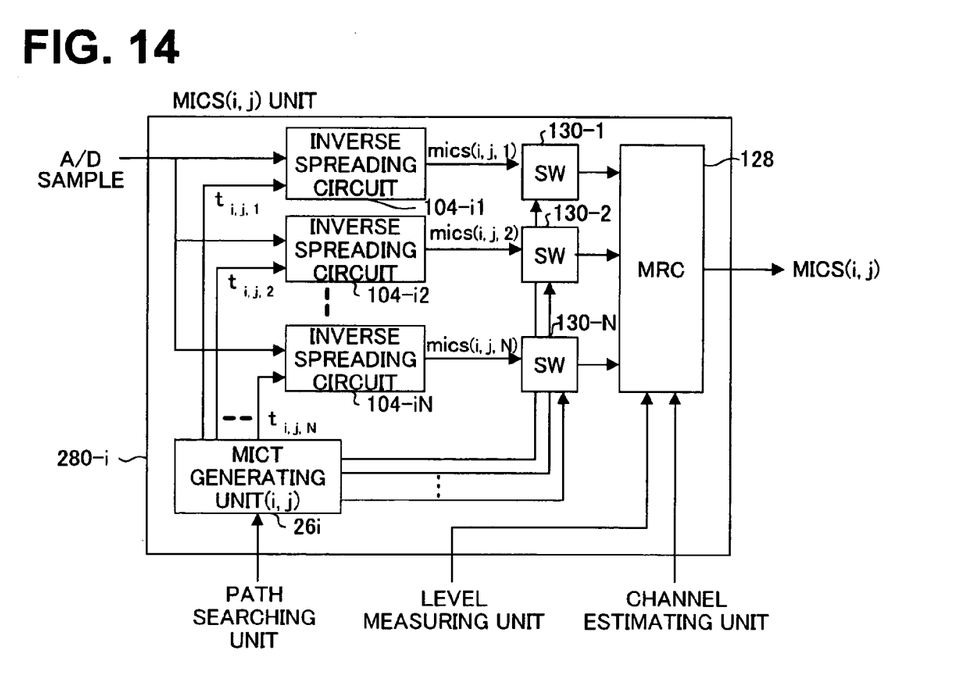
FIG. 14 shows yet another example of the construction of the MICS unit 280-$i$.

FIG. 14 shows yet another example of the construction of the MICS unit 280-$i$. While MIXR-processing, the inverse spreading timing $t_{i,j,k}$ of the mics(i,j,k) may be different from the timing $t_i$ of the desired signal. For example, in the case where each of $t_i$ is lining spaced equally from each other, $t_{i,j,k}$ may coincide with any one (1) of $t_i$. Then, the case where the timing $t_{i,j,k}$ coincides with $t_i$ is detected by the timing generating circuit 26$i$ and the signal of the case of the coincidence is blocked by switches 130-1 to 130-N. Thereby, the degradation of the characteristic can be prevented.

The timing generating unit 26$i$ in the exemplary embodiment of FIG. 14 creates the timing $t_{i,j,k}$ to correspond to the above operation and executes comparison with $t_i$. Then, when coincidence or approximation almost equal to coincidence is found, the signal is prevented from being inputted into the MRC unit 128 by controlling accordingly a switch 130-$i$ of an outputting unit of the mics(i,j,k) corresponding to the found timing.

Thereby, the mics(i,j,k) of the timing coinciding with a signal can be masked.

Here, in FIG. 8, (1) the noise level of each finger is constant in any finger in the rake composing unit 27 at the following stage of the MIXR unit 28. Furthermore, (2) that the amplitude of the data delivered from the rake composing unit 27 to a correcting unit not shown indicates the likelihood of the signal, is a precondition for the process.

In many cases, in the rake composing unit 27, in order to create appropriate signals for the correcting unit as above, the noise level of each finger is constant in any finger in the rake composing unit 27 at the following stage of the MIXR unit 28. However, when a MIXR process has been executed to each rake finger respectively, the noise level of each finger containing interference is reduced and dispersion occurs in noise power that was at an almost same level in any finger. Consequently, effect of the rake composition and error correction may not be exerted.

Figure 15:
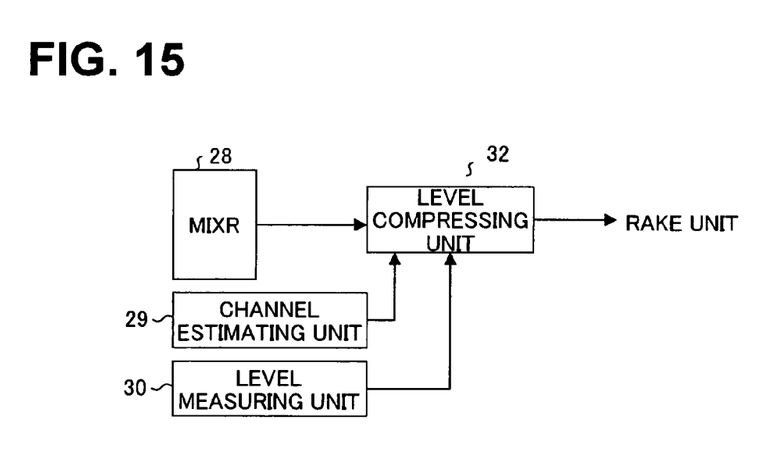
FIG. 15 shows a construction that is provided with a level correcting unit 32 between the MIXR unit 28 and a rake composing unit 27 that is the following stage of the level correcting unit 32.

Therefore, it is preferable to provide a level compensating unit 32 between the MIXR unit 28 and the rake composing unit 27 as a construction shown in FIG. 15. Thereby, the noise power can be made same as that before the MIXR process by amplifying appropriately the signal after the MIXR process.

Figure 16:
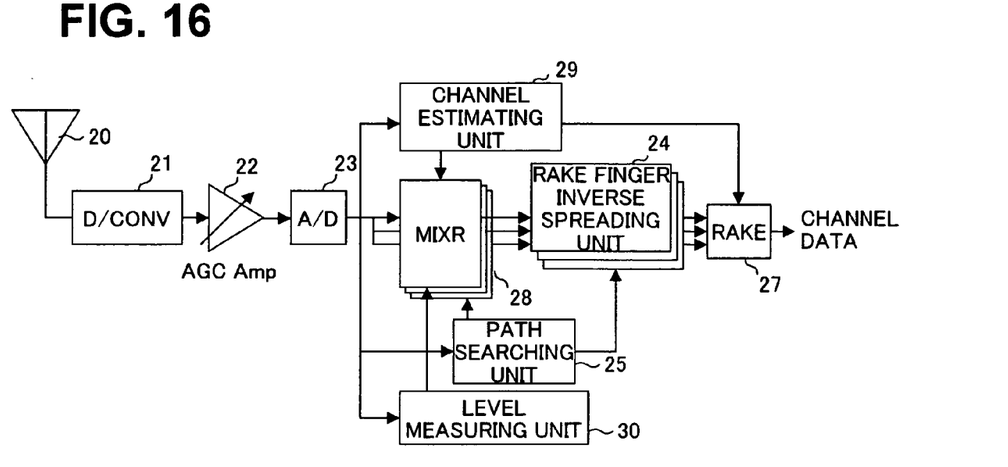
FIG. 16 shows yet another exemplary embodiment of the present invention.

FIG. 16 shows yet another exemplary embodiment of the present invention. Compared to the exemplary embodiment shown in FIG. 8, the embodiment is characterized in that the positions of the MIXR unit 28 and the inverse spreading circuit unit 24 are exchanged.

Figure 17:
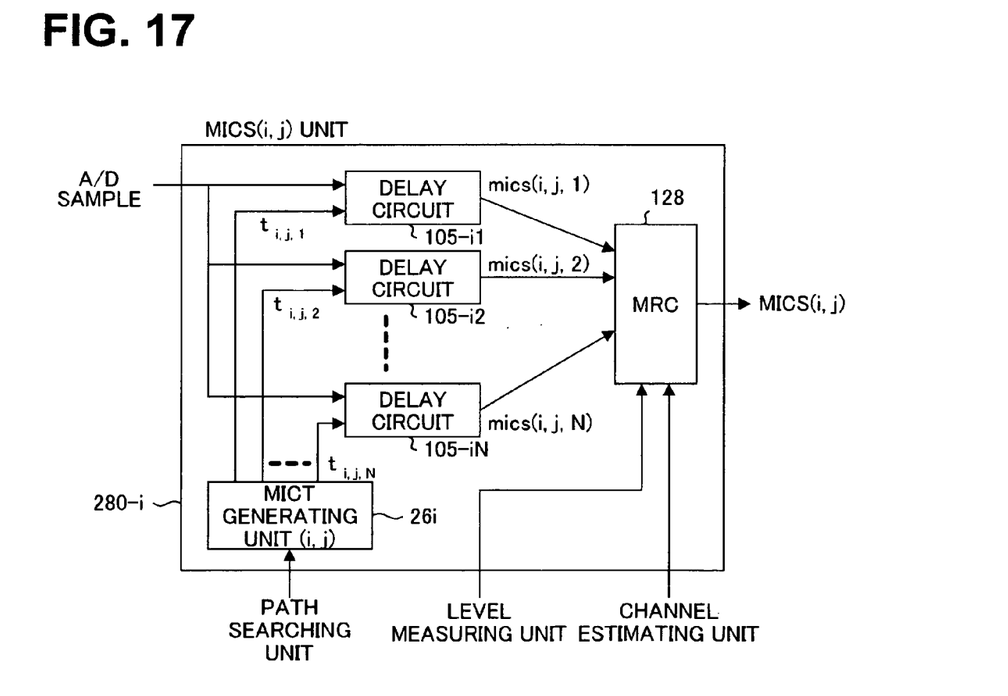
FIG. 17 shows the construction of the MICS unit 280-$i$ constituting the MIXR unit 28 in the construction of FIG. 16.

In the construction of FIG. 16, the MICS unit 280-$i$ constituting the MIXR unit 28 has a construction shown in FIG. 17. Compared to FIG. 10, the inverse spreading circuit 104-$i$ is replaced by the delay circuit 105-$i$.

As described above, the circuit construction can be simplified by arranging the MIXR unit 28 before the inverse spreading circuit unit 24.

As set forth hereinabove on the exemplary embodiments, even when the number of paths is increased, interfering noises can be effectively reduced by applying the present invention.

Thereby, a rake receiver can be provided, that executes the effective maximal ratio composition in the time domain of signals arriving at an antenna with various differences in delay time thereof caused by multiple reflections of propagation paths of the signals in a multi-path environment.

What is claimed is:

1. A rake receiver for use in a spread spectrum communication system comprising:
   a timing detecting unit to detect a reception timing $t_i$ (i=1 to N, which is an integer number of three or more than three) of each of N paths when direct spread spectrum signals of the N paths are received;
   an inverse spreading timing setting unit to set, as a timing for inverse spreading, a timing $t_{i,j,k}$ (k=1 to N, k≠j) at which an inverse spread value is obtained that has interference and correlation from the jth (j=1 to N, j≠i) path included in the inverse spread value of the ith path counted from the reception timing $t_i$ (i=1 to N) detected by the timing detecting, wherein the timing $t_{i,j,k}$ is a timing of regenerating an interference and correlation given from the jth path to the ith path by the kth path;
   a plurality of correlators each of which to obtain an inverse spread signal of the received signal corresponding to each timing set by the inverse spreading timing setting;
   a signal composing unit to compose outputs of the plurality of correlators; and
   a circuit provided between the correlators and the signal composing unit, to compose a multi-path interference signal (mics(i,j,k)) of a path k (k≠j) from the following $$MICS(i, j) = r_{i,j} \sum_{k=j} r'_k mics(i, j, k), \qquad \text{Eq. (1)}$$

to reproduce interference $\alpha_j I_{i,j}$ and to subtract the interference MICS(i,j) from the ith path, wherein $r_{i,j}$ and $r'_k$ are coefficients, wherein
   when the multi-path interference signal (mics(i,j,k)) is composed, the coefficients $r_{i,j}$ and $r'_k$ of Eq. (1) are obtained from the following Eq. (2) and Eq. (3), respectively $$r_{i,j} = \alpha_j I^2 / \{(I/N)_j + 1\} \qquad \text{Eq. (2),}$$

$$r'_k = \alpha_k^* \bigg/ \bigg\{\sum_{l \neq k} |\alpha_l|^2 I^2 + n^2 \bigg\}, \qquad \text{Eq. (3)}$$

wherein $\alpha_j$, $\alpha_k$, and $\alpha_i$ are channel estimation values respectively for jth, kth, and ith path
and the multi-path interference signal (mics(i,j,k)) is composed using the maximal ratio composition.

2. The rake receiver according to claim 1, wherein the circuit to subtract the interference MICS(i,j) includes a selecting circuit to select a plurality of paths having high power, and
   wherein the circuit to subtract the interference MICS(i,j) subjects the selected paths to processes for composing the multi-path interference signal (mics(i,j,k)) and subtracting the interference MICS(i,j).

3. The rake receiver according to claim 1, wherein the circuit to subtract MICS(i,j) from the ith path selects a plurality of paths i having high power and is provided in the quantity corresponding to the number of the selected paths.

4. The rake receiver according to claim 1, wherein the inverse spreading timing setting unit detects coincidence between the timing $t_{i,j,k}$ for the inverse spreading and a reception timing $t_i$, and does not subject the paths between which the coincidence has been detected, to the processes for composing the multi-path interference signal (mics(i,j,k)) and subtracting the interference MICS(i,j).

5. The rake receiver according to claim 1, further comprising:
a level compensating circuit disposed between the circuit to subtract the interference MICS(i,j) and the signal composing unit, the level compensating circuit acting to compensate the levels of signals after reduction of the interference in the circuit to subtract the interference MICS(i,j) to keep the level of the noises constant.

6. A rake receiver for use in a spread spectrum communication system comprising:
timing detecting unit to detect a reception timing $t_i$ (i=1 to N, which is an integer number of three or more than three) of each of N paths when direct spread spectrum signals of the N paths are received;
inverse spreading timing setting unit to set, as a timing for inverse spreading, a timing $t_{i,j,k}$ (k=1 to N, k≠j) at which an inverse spread value is obtained that has interference and correlation from the jth (j=1 to N, j≠i) path included in the inverse spread value of the ith path counted from the reception timing $t_i$ (i=1 to N) detected by the timing detecting, wherein the timing $t_{i,j,k}$ is a timing of regenerating an interference and correlation given from the jth path to the ith path by the kth path;
a plurality of correlators each of which obtains an inverse spread signal of the received signal corresponding to each timing set by the inverse spreading timing setting;
a signal composing unit to compose outputs of the plurality of correlators; and
a circuit provided between the correlators and the signal composing unit, to compose a multi-path interference signal (mics(i,j,k)) of a path k (k≠j) from the following Eq. (1), $$MICS(i, j) = r_{i,j} \sum_{k=j} r'_k mics(i, j, k), \quad \text{Eq. (1)}$$

to reproduce interference $\alpha_j I_{i,j}$ and to subtract the interference MICS(i,j) from the ith path, wherein $r_{i,j}$ and $r'_k$ are coefficients, wherein,
when the multi-path interference signal (mics(i,j,k)) is composed, noises of the multi-path interference signal (mics(i,j,k)) are approximated to be constant and the coefficients $r_{i,j}$ and $r'_k$ of Eq. (1) are obtained from the following Eq. (4) and Eq. (5), $$r_{i,j} = \alpha_j (I/N)_j \bigg/ \left( \sum_{k \neq j} |\alpha_k|^2 \right) ((I/N)_j + 1), \quad \text{Eq. (4)}$$

$$r'_k = \alpha_k^*, \quad \text{Eq. (5)}$$

wherein $\alpha_j$ and $\alpha_k$ are channel estimation values respectively for jth path and kth path,
and the multi-path interference signal (mics(i,j,k)) is composed using the maximal ratio composition.

* * * * *